US009206361B2

(12) United States Patent
Chabot et al.

(10) Patent No.: US 9,206,361 B2
(45) Date of Patent: Dec. 8, 2015

(54) HYDROPROCESSING CATALYSTS AND METHODS FOR MAKING THEREOF

(75) Inventors: Julie Chabot, Novato, CA (US); Bruce E. Reynolds, Martinez, CA (US); Erin Maris, Alameda, CA (US); Shuwu Yang, Richmond, CA (US)

(73) Assignee: Chevron U.S.A. .Inc., San Ramon, CA (US)

( * ) Notice: Subject to any disclaimer, the term of this patent is extended or adjusted under 35 U.S.C. 154(b) by 555 days.

(21) Appl. No.: 13/330,910

(22) Filed: Dec. 20, 2011

(65) Prior Publication Data

US 2012/0152805 A1 Jun. 21, 2012

Related U.S. Application Data

(60) Provisional application No. 61/424,804, filed on Dec. 20, 2010, provisional application No. 61/428,599, filed on Dec. 30, 2010, provisional application No. 61/562,850, filed on Nov. 22, 2011.

(51) Int. Cl.
| | | |
|---|---|---|
| C10G 47/26 | (2006.01) | |
| C10G 49/02 | (2006.01) | |
| B01J 37/20 | (2006.01) | |
| B01J 35/00 | (2006.01) | |
| B01J 23/883 | (2006.01) | |
| B01J 35/02 | (2006.01) | |
| B01J 35/10 | (2006.01) | |
| B01J 37/00 | (2006.01) | |
| B01J 37/02 | (2006.01) | |
| C10G 49/12 | (2006.01) | |

(52) U.S. Cl.
CPC ............. *C10G 49/02* (2013.01); *B01J 23/883* (2013.01); *B01J 35/0006* (2013.01); *B01J 35/023* (2013.01); *B01J 35/1019* (2013.01); *B01J 35/1023* (2013.01); *B01J 35/1042* (2013.01); *B01J 35/1047* (2013.01); *B01J 35/1066* (2013.01); *B01J 35/1076* (2013.01); *B01J 37/0036* (2013.01); *B01J 37/0201* (2013.01); *B01J 37/20* (2013.01); *C10G 49/12* (2013.01); *B01J 35/1052* (2013.01); *C10G 2300/208* (2013.01); *C10G 2300/4056* (2013.01); *C10G 2300/70* (2013.01); *C10G 2300/708* (2013.01); *C10G 2300/802* (2013.01)

(58) Field of Classification Search
None
See application file for complete search history.

(56) References Cited

U.S. PATENT DOCUMENTS

| | | |
|---|---|---|
| 2,850,552 A | 9/1958 | Ogle |
| 3,161,585 A | 12/1964 | Gleim et al. |
| 3,254,017 A | 5/1966 | Arey |
| 3,267,021 A | 8/1966 | Gould |
| 3,349,713 A | 10/1967 | Fassbender |
| 3,622,497 A | 11/1971 | Gleim |
| 3,694,351 A | 9/1972 | White |
| 3,694,352 A | 9/1972 | Gleim |
| 3,870,623 A | 3/1975 | Johnson et al. |
| 3,892,389 A | 7/1975 | Contastin |
| 3,915,842 A | 10/1975 | Gatsis |
| 3,919,074 A | 11/1975 | Gatsis |
| 3,992,285 A | 11/1976 | Hutchings |
| 4,066,530 A | 1/1978 | Aldridge et al. |
| 4,067,798 A | 1/1978 | Hauschildt et al. |
| 4,067,799 A | 1/1978 | Bearden, Jr. et al. |
| 4,068,830 A | 1/1978 | Gray |
| 4,077,867 A | 3/1978 | Aldridge et al. |
| 4,083,803 A | 4/1978 | Oswald et al. |
| 4,125,455 A | 11/1978 | Herbstman |
| 4,134,825 A | 1/1979 | Bearden, Jr. et al. |
| 4,148,750 A | 4/1979 | Pine |
| 4,151,070 A | 4/1979 | Allan et al. |
| 4,178,227 A | 12/1979 | Metrailer et al. |
| 4,192,735 A | 3/1980 | Aldridge et al. |
| 4,196,072 A | 4/1980 | Aldridge et al. |
| 4,226,742 A | 10/1980 | Bearden, Jr. et al. |
| 4,298,454 A | 11/1981 | Aldridge et al. |
| 4,313,818 A | 2/1982 | Aldridge et al. |
| 4,338,183 A | 7/1982 | Gatsis |
| 4,352,729 A | 10/1982 | Jacquin et al. |
| 4,370,221 A | 1/1983 | Patmore et al. |
| 4,389,301 A | 6/1983 | Dahlberg et al. |
| 4,411,768 A | 10/1983 | Unger et al. |
| 4,420,008 A | 12/1983 | Shu |

(Continued)

FOREIGN PATENT DOCUMENTS

WO  WO2010/126690  * 11/2010

OTHER PUBLICATIONS

R. Grant and C. Grant "Grant & Hackh's Chemical Dictionary" Fifth Edition, 1987, McGraw-Hill Book Company, 145.

*Primary Examiner* — Melvin C Mayes
*Assistant Examiner* — Colette Nguyen
(74) *Attorney, Agent, or Firm* — Terrence M. Flaherty

(57) ABSTRACT

A method to upgrade heavy oil feedstock using an ebullated bed reactor and a novel catalyst system is provided. The ebullated bed reactor system includes two different catalyst with different characteristics: an expanded catalyst zone containing particulate catalyst having a particle size of greater than 0.65 mm; and a slurry catalyst having an average particle size ranging from 1 to 300 µm. The slurry catalyst is provided to the ebullated bed system containing the heavy oil feedstock, and entrained in the upflowing hydrocarbon liquid passing through the ebullated bed reaction zone. The slurry catalyst reduces the formation of sediment and coke precursors in the ebullating bed reactor system. The slurry catalyst is prepared from rework materials, which form a slurry catalyst in-situ upon mixing with the heavy oil feedstock.

10 Claims, 1 Drawing Sheet

(56) References Cited

U.S. PATENT DOCUMENTS

| | | |
|---|---|---|
| 4,422,927 A | 12/1983 | Kowalczyk et al. |
| 4,422,960 A | 12/1983 | Shiroto et al. |
| 4,430,207 A | 2/1984 | Kukes |
| 4,452,265 A | 6/1984 | Lonnebring |
| 4,455,218 A | 6/1984 | Dymock et al. |
| 4,467,049 A | 8/1984 | Yoshii et al. |
| 4,485,004 A | 11/1984 | Fisher et al. |
| 4,508,616 A | 4/1985 | Larrauri et al. |
| 4,513,098 A | 4/1985 | Tsao |
| 4,551,230 A | 11/1985 | Kukes et al. |
| 4,557,823 A | 12/1985 | Kukes et al. |
| 4,557,824 A | 12/1985 | Kukes et al. |
| 4,561,964 A | 12/1985 | Singhal et al. |
| 4,564,441 A | 1/1986 | Kukes et al. |
| 4,567,156 A | 1/1986 | Bearden, Jr. et al. |
| 4,568,657 A | 2/1986 | Sepulveda et al. |
| 4,578,181 A | 3/1986 | Derouane et al. |
| 4,579,646 A | 4/1986 | Grosboll et al. |
| 4,582,432 A | 4/1986 | Mehta |
| 4,592,827 A | 6/1986 | Galiasso et al. |
| 4,606,809 A | 8/1986 | Garg |
| 4,608,152 A | 8/1986 | Howell et al. |
| 4,613,427 A | 9/1986 | Sepulveda et al. |
| 4,626,340 A | 12/1986 | Galiasso et al. |
| 4,674,885 A | 6/1987 | Erwin et al. |
| 4,678,557 A | 7/1987 | Rodriguez et al. |
| 4,695,369 A | 9/1987 | Garg et al. |
| 4,701,435 A | 10/1987 | Garcia et al. |
| 4,710,486 A | 12/1987 | Lopez et al. |
| 4,713,167 A | 12/1987 | Reno et al. |
| 4,716,142 A | 12/1987 | Laine et al. |
| 4,724,069 A | 2/1988 | Aldag, Jr. et al. |
| 4,746,419 A | 5/1988 | Peck et al. |
| 4,762,607 A | 8/1988 | Aldridge et al. |
| 4,762,812 A | 8/1988 | Lopez et al. |
| 4,764,266 A | 8/1988 | Chen et al. |
| 4,765,882 A | 8/1988 | Aldridge et al. |
| 4,770,764 A | 9/1988 | Ohtake et al. |
| 4,772,378 A | 9/1988 | Miyauchi et al. |
| 4,808,007 A | 2/1989 | King |
| 4,824,821 A | 4/1989 | Lopez et al. |
| 4,834,865 A | 5/1989 | Kukes et al. |
| 4,851,107 A | 7/1989 | Kretschmar et al. |
| 4,851,109 A | 7/1989 | Chen et al. |
| 4,857,496 A | 8/1989 | Lopez et al. |
| 4,895,639 A | 1/1990 | Bellinger et al. |
| 4,959,140 A | 9/1990 | Kukes et al. |
| 4,963,247 A | 10/1990 | Belinko et al. |
| 4,970,190 A | 11/1990 | Lopez et al. |
| 4,983,273 A | 1/1991 | Kennedy et al. |
| 4,983,558 A | 1/1991 | Born et al. |
| 5,013,427 A | 5/1991 | Mosby et al. |
| 5,017,535 A | 5/1991 | Schoonhoven et al. |
| 5,039,392 A | 8/1991 | Bearden, Jr. et al. |
| 5,055,174 A | 10/1991 | Howell et al. |
| 5,094,991 A | 3/1992 | Lopez et al. |
| 5,108,581 A | 4/1992 | Aldridge et al. |
| 5,134,108 A | 7/1992 | Thakur et al. |
| 5,162,282 A | 11/1992 | Lopez et al. |
| 5,164,075 A | 11/1992 | Lopez |
| 5,166,118 A | 11/1992 | Kretschmar et al. |
| 5,178,749 A | 1/1993 | Lopez et al. |
| 5,191,131 A | 3/1993 | Takahata et al. |
| 5,281,328 A | 1/1994 | Degnan, Jr. et al. |
| 5,320,500 A | 6/1994 | Cholet |
| 5,372,705 A | 12/1994 | Bhattacharya et al. |
| 5,409,595 A | 4/1995 | Harandi et al. |
| 5,435,908 A | 7/1995 | Nelson et al. |
| 5,452,954 A | 9/1995 | Handke et al. |
| 5,460,714 A | 10/1995 | Fixari et al. |
| 5,578,197 A | 11/1996 | Cyr et al. |
| 5,597,236 A | 1/1997 | Fasano |
| 5,622,616 A | 4/1997 | Porter et al. |
| 5,865,537 A | 2/1999 | Streiff et al. |
| 5,866,501 A | 2/1999 | Pradhan et al. |
| 5,868,923 A | 2/1999 | Porter et al. |
| 5,913,324 A | 6/1999 | Signer |
| 5,916,432 A | 6/1999 | McFarlane et al. |
| 5,932,090 A | 8/1999 | Marchionna et al. |
| 5,935,419 A | 8/1999 | Khan et al. |
| 6,059,957 A | 5/2000 | Khan et al. |
| 6,086,749 A | 7/2000 | Kramer et al. |
| 6,090,858 A | 7/2000 | El-Sayed |
| 6,136,179 A | 10/2000 | Sherwood, Jr. et al. |
| 6,190,542 B1 | 2/2001 | Comolli et al. |
| 6,217,746 B1 | 4/2001 | Thakkar et al. |
| 6,239,054 B1 | 5/2001 | Shukis et al. |
| 6,270,654 B1 | 8/2001 | Colyar et al. |
| 6,277,270 B1 | 8/2001 | Morel et al. |
| 6,454,932 B1 | 9/2002 | Baldassari et al. |
| 6,660,157 B2 | 12/2003 | Que et al. |
| 6,698,917 B2 | 3/2004 | Etchells, III et al. |
| 6,783,661 B1 | 8/2004 | Briot et al. |
| 6,797,153 B1 | 9/2004 | Fukuyama et al. |
| 7,449,103 B2 * | 11/2008 | Lott et al. ............ 208/108 |
| 2004/0013601 A1 | 1/2004 | Butz et al. |
| 2005/0241991 A1 | 11/2005 | Lott et al. |
| 2005/0241992 A1 | 11/2005 | Lott et al. |
| 2005/0241993 A1 | 11/2005 | Lott et al. |
| 2006/0175229 A1 | 8/2006 | Montanari et al. |
| 2006/0201854 A1 | 9/2006 | Lott |
| 2007/0029228 A1 | 2/2007 | Aoki et al. |
| 2007/0108100 A1 | 5/2007 | Satchell, Jr. |
| 2007/0131587 A1 | 6/2007 | Fukuyama et al. |
| 2007/0138059 A1* | 6/2007 | Farshid et al. ............ 208/57 |
| 2007/0158239 A1 | 7/2007 | Satchell |
| 2007/0219083 A1 | 9/2007 | Zhang et al. |
| 2007/0219084 A1 | 9/2007 | Parasher et al. |
| 2007/0231248 A1 | 10/2007 | Rueter et al. |
| 2008/0081017 A1 | 4/2008 | Zhou et al. |
| 2008/0166288 A1 | 7/2008 | Zhou et al. |
| 2008/0193345 A1 | 8/2008 | Lott et al. |
| 2009/0247652 A1 | 10/2009 | Silverman et al. |
| 2009/0310435 A1 | 12/2009 | Lott et al. |
| 2010/0294701 A1 | 11/2010 | Lott et al. |
| 2011/0005976 A1 | 1/2011 | Rispoli et al. |
| 2011/0220553 A1 | 9/2011 | Lott et al. |
| 2011/0226667 A1 | 9/2011 | Lott et al. |

* cited by examiner

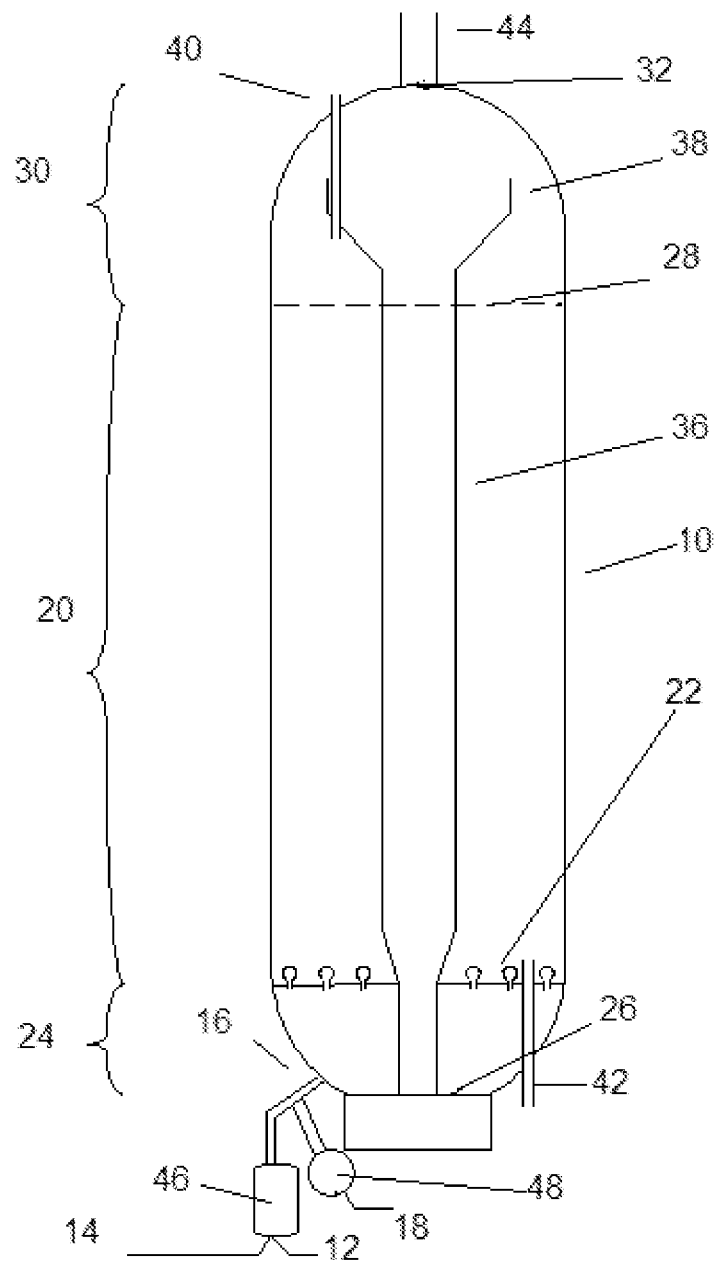

HYDROPROCESSING CATALYSTS AND METHODS FOR MAKING THEREOF

RELATED APPLICATIONS

This application claims benefit under 35 USC 119 of U.S. Provisional Patent Application Nos. 61/424,804 with a filing date of Dec. 20, 2010; 61/428,599 with a filing date of Dec. 30, 2010; and 61/562,850 with a filing date of Nov. 22, 2011. This application claims priority to and benefits from the foregoing, the disclosures of which are incorporated herein by reference.

TECHNICAL FIELD

The invention relates generally to catalysts for use in the conversion of heavy oils and residua and methods for making thereof.

BACKGROUND OF THE INVENTION

Heavy oil is particularly difficult to upgrade in refinery operations. Metals contained in the oil tend to rapidly deactivate catalysts with which they come in contact during the upgrading process. Heavy oils often contain high concentrations of sulfur and nitrogen, which are difficult to remove to the extent necessary for further processing of the upgraded products from heavy oil processing. The aromatic character of many heavy oils tends to contribute to instability of the upgraded products. While heating the heavy oils, even in the presence of high pressure hydrogen, components of the heavy oil thermally crack to yield free radicals, which quickly combine to make sediment and coke precursors unless they are quickly suppressed by active catalysis. Furthermore, during catalysis, high molecular weight coke precursors deposit on catalysts and quickly reduce catalytic activity.

Rapid deactivation of catalysts used in heavy oil processing service often requires frequent replacement of catalysts in the heavy oil processing systems. Several systems have been proposed for replacing a portion of the catalyst at regular intervals during the heavy oil processing, without requiring that the system be shut down for catalyst replacement. In an ebullated bed heavy oil processing system, the catalyst is maintained in a fluidized state within the reaction zone. At periodic intervals, a portion of the fluidized bed of catalyst, along with a small portion of fluidizing liquid, is removed from the system. A comparable amount of catalyst is added to the system, to maintain a constant quantity of catalyst in the system at any one time.

An ebullated bed processing system for use in heavy oil processing has a fairly low catalyst/oil ratio within the reaction zone. It is desirable to increase the catalyst/oil ratio to improve the overall effectiveness of the system, without requiring significant modifications to the system. U.S. Pat. Nos. 7,815,870; 7,449,103; 8,024,232; 7,618,530, and US Patent Publication Nos. 2011/0226667 and 2009/0310435 disclose ebullating bed hydroprocessing systems wherein the catalyst system comprises both a porous supported catalyst and a "colloidal" catalyst for the upgrade of heavy oil feedstock. The single-metallic colloidal catalyst employed is synthesized in-situ upon mixing with the heavy oil feedstock under sufficient conditions for sulfidation to occur; thus tight control of the catalyst properties is difficult. A process employing an in-situ synthesized catalyst requires carefully controlled steps for the dilution of the catalyst precursor and mixing with a heavy oil feedstock for sulfidation to take place.

There is still a need for an improved reaction feed system with improved properties and performance for heavy oil conversion processes.

SUMMARY

In one aspect, the invention relates to an ebullated bed heavy oil processing system for converting heavy oil. The process comprises: passing a reaction mixture comprising heavy oil feedstock in the presence of hydrogen and a slurry catalyst to an ebullated bed reaction zone, the slurry catalyst having an average particle size ranging from 1 to 300 µm; upflowing the mixture comprising the heavy oil and slurry catalyst and hydrogen through an expanded catalyst zone in the ebullated bed reaction zone and fluidizing a particulate catalyst in the expanded catalyst zone to produce an upgraded heavy oil, the particulate catalyst having a particle size of greater than 0.65 mm (1/40 in.); and passing the upgraded heavy oil and at least a portion of the slurry catalyst to a disengagement zone of the ebullated bed reaction zone.

In another aspect, the invention relates to a dual catalyst system for use in an ebullated bed system, the feed system comprising a slurry catalyst with an average particle size ranging from 1 to 300 µm, and a particulate catalyst having a particle size of greater than 0.65 mm (1/40 in.) for use in the expanded catalyst zone of the ebullated system, wherein the slurry catalyst is injected into the ebullated bed system forming a mixture with the heavy feedstock.

In yet another aspect, the invention relates to a process for converting heavy oil using an ebullated bed system, the process comprising: passing a reaction mixture comprising a heavy oil feedstock and a slurry catalyst in the presence of hydrogen to a hydroconversion reaction zone, forming a reaction mixture; upflowing the reaction mixture through an expanded catalyst zone employing a particulate catalyst in the hydroconversion reaction zone and fluidizing the particulate catalyst in the expanded catalyst zone to produce an upgraded heavy oil; wherein the slurry catalyst has an average particle size ranging from 1 to 300 µm.

In one other aspect, the invention relates to an ebullating bed reaction system for heavy oil upgrade, comprising: an expanded catalyst zone comprising a particulate catalyst having a particle size of greater than 0.65 mm and a slurry catalyst having an average particle size of at least 1 µm; a plenum chamber below the expanded catalyst zone containing slurry catalyst in the absence of particulate catalyst; and a disengagement zone above the expanded catalyst zone, at least a portion of which contains slurry catalyst in the absence of the particulate catalyst. In one embodiment, the reaction system further comprises a recirculation conduit for recirculating at least a portion of a hydrocarbonaceous liquid in the disengagement zone to the plenum chamber.

In yet another aspect, the invention relates to a method of upgrading a pre-existing ebullated bed hydroprocessing system in order to reduce formation of coke and/or sediment, comprising: (a) operating a pre-existing ebullated bed hydroprocessing system comprising one or more ebullated bed reactors, each of which comprises a liquid hydrocarbon phase, a solid phase comprised of an expanded bed of particulate catalyst, a gaseous phase comprising hydrogen gas, and catalyst free zones above and below the expanded bed of the particulate catalyst; (b) providing a sulfided slurry catalyst having an average particle size ranging from 1 to 300 µm; (c) introducing a heavy oil feedstock and the slurry catalyst into at least one ebullated bed reactor, wherein the slurry catalyst is dispersed throughout the liquid hydrocarbon phase of the pre-existing ebullated bed hydroprocessing system;

and (d) operating the upgraded ebullated bed hydroprocessing system to form a hydroprocessed material, wherein the introduction of the slurry catalyst reduces formation of coke or sediment in the upgraded ebullated bed hydroprocessing system compared to the pre-existing ebullated bed hydroprocessing system.

In another aspect, the invention relates to a method of hydroprocessing a heavy oil feedstock. The method comprises: (a) introducing to an ebullated reactor a heavy oil feedstock feed and a slurry catalyst having an average particle size ranging from 1 to 300 µm; heating or maintaining the heavy oil feedstock at a hydrocracking temperature to yield an upgraded material; wherein the ebullated bed reactor comprising: a liquid phase comprised of hydrocarbons and the slurry catalyst; a solid phase comprised of a particulate catalyst within an expanded catalyst bed; a gaseous phase comprised of hydrogen; and zones above and below the expanded catalyst bed that are devoid of the particulate catalyst, and wherein the slurry catalyst being dispersed throughout the liquid phase, including the particulate catalyst free zones, and catalyzing reactions between the hydrogen and free radicals formed from the heavy oil feedstock throughout the liquid phase, including the particulate catalyst free zones, to yield an upgraded material while reducing or eliminating formation of coke precursors and sediment within the ebullated bed reactor compared to an ebullated bed reactor in the absence of the slurry catalyst.

In one aspect, the invention relates to an ebullated bed hydroprocessing system. The system comprises an ebullated bed reactor which is comprised of: an expanded catalyst bed comprising a particulate catalyst; an upper region above the expanded catalyst bed that is devoid of the particulate catalyst; a lower region below the expanded catalyst bed that is devoid of the particulate catalyst; a liquid hydrocarbon phase comprised of a heavy oil feedstock within the expanded catalyst bed, the upper region, and the lower region; a slurry catalyst having an average particle size ranging from 1 to 300 µm dispersed throughout the liquid hydrocarbon phase; and a gaseous phase comprised of hydrogen gas dispersed in the liquid hydrocarbon phase.

BRIEF DESCRIPTION OF THE DRAWINGS

FIG. 1 illustrates an embodiment of the ebullated bed reaction zone, including the provision of slurry catalyst to the reaction zone.

DETAILED DESCRIPTION

The following terms will be used throughout the specification and will have the following meanings unless otherwise indicated.

The term "hydrocarbon" refers broadly to any compound containing both hydrogen and carbon and includes liquid, vapor and combined liquid/vapor streams containing greater than about 80 weight percent hydrogen and carbon, calculated as the elements.

"Hydrocarbonaceous liquid" refers to a liquid phase hydrocarbon.

"Sediment" refers to filterable insoluble material that occurs in heavy oil. In general, the amount of sediment tends to increase as the boiling weight of the heavy oil increases. Sediment is produced in the heavy oil at high temperatures, often from thermal decomposition of molecules in the heavy oil. There are a number of tests for sediment. The Shell Hot Filtration test is one example. Although sediment may be quite troublesome for downstream processing, it is generally in low concentrations (e.g. less than 1-2 wt. % in the heaviest vacuum residuum product from the ebullated bed reaction zone).

"Unsupported catalyst" may be used interchangeably with "bulk catalyst" or "self-supported catalyst," referring to catalysts that are not of the conventional catalyst form, having a preformed, shaped catalyst support which is then loaded with metals via impregnation or deposition methods. In one embodiment, the unsupported catalyst is formed through precipitation. In another embodiment, the unsupported catalyst has diluent (or binder) incorporated into the catalyst composition. In yet another embodiment, the unsupported catalyst is formed from metal compounds and without any binder. In one embodiment, the unsupported catalyst is a dispersing-type catalyst ("slurry catalyst") type with dispersed particles in a liquid mixture (e.g., hydrocarbon oil).

"Supported catalyst" refers to a catalyst that is affixed onto a shaped/preformed solid ("a carrier" or a support) comprising any of alumina, silica, magnesia, titania, aluminosilicates, aluminophosphates, carbon, porous metals, and combinations thereof. The catalyst is affixed onto the support via methods including but not limited to impregnation or deposition.

"Rework" may be used interchangeably with "rework materials" or "catalyst fines," referring to catalyst products, scrap pieces, fines, rejected materials obtained from the process of making any of sulfided catalyst, unsulfided supported catalyst, and unsulfided self-supported catalyst, reduced in size to fines or powdered materials containing one or more catalytic materials. The catalyst fines can be generated from a catalyst product, or from rejected materials/scrap pieces containing catalytic materials generated in the process of making the catalyst product. In one embodiment, the rework is from the process of making supported catalyst precursor, in the form of final products, catalyst fines, broken pieces, scrap pieces and the like, and before the shaped catalyst precursor is sulfided. In one embodiment, the rework is in the form of final products, waste, fines, etc., generated from the process of forming/shaping a bulk catalyst precursor and before the sulfidation step. In another embodiment, the rework is in the form of fines generated from grinding any of supported catalyst products, unsupported catalyst products, scrap pieces, fines, and combinations thereof, generated in a process to make a supported catalyst or an unsupported catalyst.

"Catalyst precursor" refers to a compound containing one or more catalytically active metals, from which compound a slurry catalyst is formed, and which compound may be catalytically active as a hydroprocessing catalyst, an example is a water-based catalyst prior to the transformation step with a hydrocarbon diluent, or an oxide or hydroxide catalyst precursor prior to the sulfidation step.

"Slurry catalyst" refers to a suspension of catalyst and/or catalyst precursor solid particles in a liquid carrier such as hydrocarbon diluent or heavy oil, which solid particles have an average particle size of greater than 1 µm. In the process, the slurry catalyst is supplied to the reaction zone, or to liquids flowing to the reaction zone, as a slurry in a hydrocarbonaceous liquid or other suitable liquid carrier. In one embodiment, the slurry catalyst is a "powdered catalyst" prepared from rework material.

"Double salt metal precursor" refers to a metal precursor having at least two different metal cations in the crystal lattice, with at least one Primary metal cation and at least one Promoter metal cation, e.g., ammonium nickel molybdate (formed from ammonium molybdate with nickel sulfate).

"Heavy feedstock" and "heavy oil feedstock" and "heavy oil" are used interchangeably to refer to a fossil fuel feedstock and/or fraction thereof including, but not limited to, one or more of heavy crude oil, a reduced crude oil, petroleum residuum, atmospheric tower bottoms, vacuum tower bottoms, tar sands bitumen, shale oil, liquefied coal, coal tar, or reclaimed oil. Heavy feedstocks typically contain contaminants, such as carbon residue, sulfur, and metals, which are known to deactivate the catalysts used to upgrade the heavy feedstocks to more valuable products such as transportation fuels and lubricating oils. An exemplary atmospheric tower bottoms has a boiling point of at least 343° C. (650° F.); an exemplary vacuum tower bottoms has a boiling point of at least 524° C. (975° F.). Heavy oil within the hydroconversion reaction zone will contain some amount of converted or upgraded products, the amount depending on the extent of reaction to which the heavy oil has been subjected. In one embodiment, properties of heavy oil feedstock include, but are not limited to a sulfur content of at least 2 wt. %, a metal (Ni/V/Fe) content of greater than 10 ppm by weight, a density of more than 0.93 g/cm$^3$, (or more than 0.97 g/cm$^3$, or ranging from 0.97 to 1.13 g/cm$^3$). Exemplary heavy oil feeds include Athabasca bitumen (Canada), which typically has at least 50% by volume vacuum reside, a Boscan (Venezuela) heavy oil feed, which may contain at least 64% by volume vacuum residue, a Borealis Canadian bitumen, which may contain about 5% sulfur and 19% of asphaltenes.

"Treatment," "treated," "upgrade", "upgrading" and "upgraded", when used in conjunction with a heavy oil feedstock, describes a heavy oil feedstock that is being or has been subjected to hydroprocessing, or a resulting material or crude product, having a reduction in the molecular weight of the heavy oil feedstock, a reduction in the boiling point range from the heavy oil feedstock, a reduction in the concentration of asphaltenes, a reduction in the concentration of hydrocarbon free radicals, and/or a reduction in the quantity of impurities, such as sulfur, nitrogen, oxygen, halides, and metals.

The upgrade or treatment of heavy oil feeds is generally referred herein as "hydroprocessing" (hydrocracking, or hydroconversion). Hydroprocessing is meant as any process that is carried out in the presence of hydrogen, including, but not limited to, hydroconversion, hydrocracking, hydrogenation, hydrotreating, hydrodesulfurization, hydrodenitrogenation, hydrodemetallation, hydrodearomatization, hydroisomerization, hydrodewaxing and hydrocracking including selective hydrocracking. The products of hydroprocessing may show improved viscosities, viscosity indices, saturates content, low temperature properties, volatilities and depolarization, etc.

SCF/BBL (or scf/bbl) refers to a unit of standard cubic foot of gas (N$_2$, H$_2$, etc.) at 60° F. and 1 atmosphere pressure per barrel of hydrocarbon feed, or slurry catalyst, depending on where the unit is used.

The Periodic Table referred to herein is the Table approved by IUPAC and the U.S. National Bureau of Standards, an example is the Periodic Table of the Elements by Los Alamos National Laboratory's Chemistry Division of October 2001.

"Metal" refers to metallic elements in their elemental, compound, or ionic form. "Metal precursor" refers to the metal compound feed to the process. The term "metal" or "metal precursor" in the singular form is not limited to a single metal or metal precursor, e.g., a Group VIB or a Promoter metal, but also includes the plural references for mixtures of metals. "In the solute state" means that the metal component is in a protic liquid form.

"Group VIB metal" refers to chromium, molybdenum, tungsten, and combinations thereof in their elemental, compound, or ionic form.

"Group VIII metal" refers iron, cobalt, nickel, ruthenium, rhenium, palladium, osmium, iridium, platinum, and combinations thereof.

"d" block elements refer to elements of the Periodic Table wherein the d sublevel of the atom is being filled. Examples include Sc, Ti, V, Cr, Mn, Fe, Co, Ni, Cu, and Zn.

"Primary metal" refers to a metal in its elemental, compound, or ionic form selected from any of Group VIB (IUPAC nomenclature Group 6), Group VIII metals (IUPAC nomenclature Group s 8-10), Group IIB metals, "d" block elements, and combinations thereof which, in its sulfided form, functions as a catalyst in a hydroprocessing process. The Primary metal is present in a catalyst in a larger amount than other metals.

"Promoter metal" refers to a metal in its elemental, compound, or ionic form selected from any of Group IVB (IUPAC nomenclature Group 4), Group VIB (IUPAC nomenclature Group 6), Group VIII, Group IIB (IUPAC nomenclature Group 12), and combinations thereof, added to increase the catalytic activity of the Primary metal. Promoter metal is present in a smaller amount than the Primary metal, in a range from 1-50 wt. % (Promoter metal to Primary metal).

"Free of Promoter metal" or "substantially free of Promoter metal" means that in making the catalyst, no Promoter metal in their elemental, compound, or ionic form, is added. Traces of Promoter metals can be present, in an amount of less than 1% of the Primary metal (wt. %).

1000° F.+ conversion rate refers to the conversion of a heavy oil feedstock having a boiling point of greater than 1000° F.+ to less than 1000° F. (538.° C.) boiling point materials in a hydroconversion process, computed as: 100%* (vol % boiling above 1000° F. materials in feed–vol % boiling above 1000° F. materials in products)/vol % boiling above 1000° F. materials in feed). 1000° F.+ conversion rate sometimes can also be computed based on wt. %, such as: 100%* (wt. % boiling above 1000° F. materials in feed–wt. % boiling above 1000° F. materials in products)/wt. % boiling above 1000° F. materials in feed).

Pore porosity and pore size distribution can be measured using mercury intrusion porosimetry, designed as ASTM standard method D 4284, or measured using the nitrogen adsorption method.

Particle size and particle size distribution in one embodiment are measured using laser diffraction analysis technique, employing commercially available laser particle size analyzers known in the art.

The present system and process for upgrading heavy oil is suitable for hydroprocessing a petroleum based material, such as a heavy oil; liquids prepared from coal, tar sands, shale oil; the product from a hydrocarbon synthesis process such as Fischer Tropsch; or combinations thereof. The system includes two different catalysts. In one embodiment of the dual catalyst system, the first catalyst is a supported catalyst characterized by catalyst particulates ("extrudates" or "pellets") comprising a metal or metal compound having hydrogenation activity and supported on a support, having particle sizes within a range to fluidize in an expanded catalyst bed within the system. As used herein, the supported catalyst is termed a "particulate catalyst". The second catalyst is a slurry catalyst. The particle size of the slurry catalyst is within a range to permit the catalyst to be transported upward through an expanded catalyst bed within the hydroconversion reaction zone by fluids flowing upward through the zone. The slurry catalyst is characterized as having a smaller particle size relative to that of the particulate catalyst. Other catalysts may be employed as needed to achieve objectives that are specific to an individual operation of the system.

The hydroconversion reaction process involves the conversion of heavy oil by contacting the heavy oil with hydrogen in the presence of the dual catalyst system. Conversion reactions include one or more of: molecular weight reduction by catalytic or thermal cracking; heteroatom or metal removal; asphaltene or carbon residue reduction; olefin or aromatic saturation; and skeletal or double bond isomerization. Reactions of this type are generally conducted at elevated temperatures and at supra-atmospheric pressures in combination with hydrogen and in the presence of a catalyst.

Ebullated Bed Heavy Oil Processing System:

In one embodiment, the hydroconversion reaction zone is an ebullated bed heavy oil processing system, which typically includes at least one ebullated bed reaction zone, with each zone generally contained within a single reactor vessel. In one embodiment, the ebullated bed heavy oil processing system comprises multiple reaction zones, each in fluid contact via at least one fluid stream with at least one other reaction zone in the system. The ebullated bed reaction zone includes an expanded catalyst zone comprising particulate catalyst, which is maintained by upflowing heavy oil and hydrogen through the bed at a velocity sufficient to expand or fluidize the particulate catalyst in the bed, but modulated such that the particulate catalyst are not carried out of the reactor vessel by the upflowing fluids. The ebullated bed reaction zone further includes a plenum chamber below the expanded catalyst zone and bounded by a distributor grid plate and the bottom of the reactor vessel, and a disengagement zone above the expanded catalyst zone. Both the plenum chamber and the disengagement zone contain hydrocarbonaceous liquid in the absence of particulate catalyst.

The ebullated bed heavy oil processing system further includes a port at the top of the reactor for introducing particulate catalyst and a port at the bottom of the reactor for removing particulate catalyst; a port at the bottom of the reactor for introducing heavy oil feedstock and hydrogen gas under pressure and at elevated temperature into the reactor, and a port near the top of the reactor through which upgraded heavy oil, unreacted hydrogen and gaseous products are removed. Heavy oil feed entering the reaction zone passes in turn through a plenum chamber below the expanded catalyst zone, through the distributor grid plate supporting the expanded catalyst zone, and upward through the expanded catalyst zone. A recirculation conduit and a recirculation receiver are included in the ebullated bed reaction zone to facilitate circulation of the hydrocarbonaceous liquid via a circulation pump through the reaction zone. The circulation pump can be located externally as in H-Oil or H-Coal ebullating bed reactor systems, or internally, e.g., LC-Fining ebullating reactor system.

Heavy Oil Feedstock

The heavy oil feedstock may comprise any fossil fuel feedstock and/or fraction thereof including, but not limited to, one or more of heavy crude oil, a reduced crude oil, petroleum residuum, atmospheric tower bottoms, vacuum tower bottoms, tar sands bitumen, shale oil, liquefied coal, coal tar, reclaimed oil, heavy residual oils generated by solvent deasphalting of petroleum residua including the DAO and pitch fractions from the deasphalting process, and other residuum fractions. In one embodiment, the heavy oil feedstock includes a significant fraction of high boiling point hydrocarbons, with boiling points at or above 343° C. (650° F.). In one embodiment, the heavy oil feedstock has a boiling range at or above 524° C. (975° F.). Heavy oil feedstocks which can be treated in the present process contain asphaltenes. Asphaltenes are complex hydrocarbon molecules that include a relatively low ratio of hydrogen to carbon that is the result of a substantial number of condensed aromatic and naphthenic rings with paraffinic side chains. The asphaltene fraction also contains a higher content of sulfur and nitrogen than does crude oil or the rest of the vacuum residuum, and it also contains higher concentrations of carbon-forming compounds.

Particulate Catalyst:

In the process, the heavy oil is converted in a hydroconversion reaction zone, which contains an expanded catalyst zone comprising a particulate catalyst. The particulate catalyst generally includes one or more metals known to have hydrogenation activity affixed onto a porous refractory base ("a carrier") comprising one or more of alumina, iron oxide, silica, magnesia, titania, zeolite, silica-aluminate, phosphorous or various combinations of these. The alumina in the base can be in several forms including amorphous, alpha, gamma, theta, boehmite, pseudo-boehmite, gibbsite, diaspore, bayerite, nordstrandite and corundum. In one embodiment, the alumina is boehmite or pseudo-boehmite. In one embodiment, carbon may be used as a support. In one embodiment, the base may be an ore or mineral or waste product or a manufactured form of alumina. The metals that are used in the particulate catalyst include base metals or compounds thereof, selected from Group VIB metals or Group VIII metals of the Periodic Table, or combinations thereof. Representative metals that are used include one or more of the Group VIB metals, such as chromium, molybdenum and tungsten, and one or more of the Group VIII metals, such as iron, cobalt and nickel. In one embodiment, the particulate catalyst is a composite of a Group VI metal or compound thereof and a Group VIII metal or compound thereof.

In one embodiment, the metals or metal compounds, e.g., metal oxide, metal hydroxide, metal sulfide and combinations thereof, are supported on the porous refractory base such as alumina. Exemplary particulate catalysts include but are not limited to molybdenum, cobalt molybdenum, nickel sulfide, nickel tungsten, cobalt tungsten and nickel molybdenum on an alumina support. The particulate catalyst comprises 1 wt. % to 20 wt. % molybdenum in one embodiment; and from 3 wt. % to 15 wt. % molybdenum in a second embodiment.

In one embodiment, the particulate catalyst has a nominal particle size of at least 0.65 mm (1/40"). In some embodiments, the particulate catalyst has a spherical shape having a particle diameter of at least 0.65 mm. In another embodiment, the particulate catalyst comprises pellets or grains that are 1 to 1.5 mm in size to facilitate suspension by the liquid phase in the reactor. In one embodiment, the particulate catalyst has a cylindrical shape having a cross sectional diameter in the range from 1.0 mm (0.04 inch) mm to 10 mm (0.4 inch), and a length normal to the cross sectional diameter such that the length to diameter ratio is in the range from 2 to 8. In one embodiment, the particulate catalyst has an irregular shape. While it is desirable to employ particulate catalysts with uniform dimensions, a small fraction of particulate catalyst may have dimensions that fall outside of these ranges.

The particulate catalyst has a high surface area and a high pore volume (as measured by nitrogen adsorption method). In general, the surface area of the particulate catalyst is greater than 100 $m^2/g$. In one embodiment, the surface area of the particulate catalyst is in the range from 100 to 350 $m^2/g$, or in the range from 150 to 350 $m^2/g$ in a second embodiment. In general, the pore volume of the particulate catalyst is greater than 0.4 $cm^3/g$. In one embodiment, the pore volume of the particulate catalyst is in the range from 0.4 $cm^3/g$ to 1.2 $cm^3/g$. In one embodiment, the pore volume of the particulate catalyst is in the range from 0.4 $cm^3/g$ to 1.0 $cm^3/g$.

Details regarding particulate catalysts and methods for making thereof can be found in U.S. Pat. Nos. 7,803,266; 7,185,870; 7,449,103; 8,024,232; 7,618,530; 6,589,908; 6,667,271; 7,642,212; 7,560,407, 6,030,915, U.S. Pat. No. 5,980,730, U.S. Pat. No. 5,968,348, U.S. Pat. No. 5,498,586, and US Patent Publication Nos. 2011/0226667, 2009/0310435, 2011/0306490, the relevant disclosures are included herein by reference.

Slurry Catalyst

In one embodiment, the slurry catalyst is prepared from at least one Primary metal precursor (e.g., a Group VIB metal precursor) and at least one Promoter metal precursor (e.g., a Group VIB metal precursor different from the Primary metal precursor, or a Group IIB metal precursor, or a Group VIII metal precursor such as Ni, or a Group IVA metal precursor such as Ti). In another embodiment, the catalyst is prepared from at least a Primary metal precursor with no Promoter metal added. In yet another embodiment, the catalyst is prepared from at least a Group VIII metal such as a nickel compound as the Primary metal component, with or without the subsequent addition of other metals as Promoter metals. In yet another embodiment, the catalyst is prepared from a double salt precursor in solution. The double salt precursor contains at least two different metal cations, e.g., prepared from at least two different metal precursor feeds. Multiple Promoter metal precursors can be used as the feedstock, e.g., different Group VIII metal precursors are used such as Ni and Co, metal precursors comprising different "d" elements such as Fe and Zn, or Cu and Fe. Multiple Primary metal precursors can be used as co-catalyst, e.g., Mo and W.

In one embodiment, at least one of the metal precursors may be oil soluble, oil dispersible, water soluble and/or water dispersible in the preparation of the slurry catalyst. The metal precursors can be provided as an elemental metal or as a metal compound. The metal precursors can be added in the solid state. In one embodiment, one of the metal precursors can be added in the solid state, while the second metal precursor can be added in the solute state. The metal precursors can be the same or different, e.g., all organic compounds, all inorganic compounds, or one organic and one inorganic. The metal precursors in one embodiment can be catalytically active, e.g., a reagent grade metal sulfide or a beneficiated ore.

In one embodiment, at least one of the metal precursors is an organic compound selected from metal salts of organic acids, such as acyclic and alicyclic aliphatic, carboxylic acids containing two or more carbon atoms. Non-limiting examples include acetates, oxalates, citrates, naphthenate and octoates. In another embodiment, the metal precursors are selected from salts of organic amines. In yet another embodiment, the metal precursors are selected from organometallic compounds, e.g., chelates such as 1,3-diketones, ethylene diamine, ethylene diamine tetraacetic acid, phthalocyanines and mixtures thereof. In another embodiment, the organic metal precursors are selected from salts of dithiolate, dithiocarbamate, and mixtures thereof. An example is a Group VIII dithiocarbamate complex, or a soluble molybdenum-containing organophosphorodithioate such as molybdenum dialkyl dithiophosphate for the Group VIB metal precursor. The metal precursors can also be sulfur-containing organic compounds, e.g., a chelate compound with sulfur as a coordinating atom such as sulfhydryl S—H, or a molybdenum oxysulfide dithiocarbamate complex (Molyvan A).

In one embodiment, the Group VIB metal precursor (as a Primary metal or a Promoter metal) is selected from the group of alkali metal or ammonium metallates of molybdenum in organic solvents such as a normal alkane, hydrocarbons, or petroleum products such as distillate fractions wherein the molybdenum compound is allowed to subsequently decompose under pressure and temperature, prior to or concurrent with the addition of the Promoter metal precursor. In another embodiment, the Group VIB metal precursor feed is a water-soluble salt, e.g., oxides and polyanions such as molybdates, tungstates, chromates, dichromates, etc. In one embodiment, the Group VIB metal precursor is selected from the group of alkali metal heptamolybdates, alkali metal orthomolybdates, alkali metal isomolybdates, phosphomolybdic acid, and mixtures thereof. In another embodiment, it is selected from the group of molybdenum (di- and tri) oxide, molybdenum carbide, molybdenum nitride, aluminum molybdate, molybdic acid (e.g. $H_2MoO_4$), or mixtures thereof. In yet another embodiment, the Group VIB metal compound is an organometallic complex, e.g., oil soluble compound or complex of transition metal and organic acid, selected from naphthenates, pentanedionates, octoates, acetates, and the like. Examples include molybdenum naphthanate and molybdenum hexacarbonyl.

In one embodiment, the Promoter metal precursor is a Group VIII metal compound selected from the group of sulfates, nitrates, carbonates, sulfides, oxysulfides, oxides and hydrated oxides, ammonium salts and heteropoly acids thereof. In one embodiment, the Group VIII metal precursor is a water-soluble compound such as acetate, carbonate, chloride, sulfate, nitrate, acetylacetone, citrate, and oxalate, e.g., nickel nitrate, nickel sulfate, nickel acetate, nickel chloride, etc., and mixtures thereof. In another embodiment, the metal precursor is a compound which is at least partly in the solid state, e.g., a water-insoluble nickel compound such as nickel carbonate, nickel hydroxide, nickel phosphate, nickel phosphite, nickel formate, nickel sulfide, nickel molybdate, nickel tungstate, nickel oxide, nickel alloys such as nickel-molybdenum alloys, Raney nickel, or mixtures thereof.

In one embodiment, polar aprotic solvents are used in conjunction with inorganic metal precursors for the preparation of the precursor feed. The organic solvent, e.g., an organosulfur compound which is compatible with both the inorganic metal precursor and the oil feedstock, acts as a solvent to dissolve the inorganic metal precursor. With the use of the organic solvent, the inorganic metal precursor becomes miscible/dispersible in a hydrocarbon diluent or heavy oil feedstock, thus alleviating the need for a transforming step. Examples of organic solvents include but are not limited to polar aprotic solvents such as N-Methylpyrrolidone (NMP), dimethylformamide (DMF), dimethylacetamide (DMAC), hexamethylphosphortriamide (HMPA), dimethyl sulfoxide (DMSO), tetrahydrofuran, propylene carbonate, dimethyl sulfite, N-nitrosodimethylamine, γ-butyrolactone, N:N dimethyl formamide, dimethyl carbonate, methyl formate, butyl formate and mixtures thereof. The organic solvent can be used as neat liquids, or in combination with other inexpensive solvents such as water or methanol. Examples of inorganic metal precursors for use with the organic solvent include but are not limited to molybdenum oxide, sulfide, or oxysulfide of the general formula $Moo_xS_y$, wherein $x \geq 0$, $y \geq 0$.

In one embodiment, the Promoter metal precursor is a Group IIB metal precursor such as zinc. Zinc is a less expensive material and more environmentally friendly than other metal precursors such as nickel. Examples include but are not limited to Group JIB inorganic compounds such as zinc sulfate, zinc nitrate, zinc carbonate, zinc sulfide, zinc oxysulfide, zinc oxide and zinc hydrated oxide, zinc ammonium salts and heteropoly acids thereof. In one embodiment, the Group VIII or Group IIB metal precursor is a compound which is at least partly in the solid state, e.g., a water-insoluble nickel compound such as nickel carbonate, nickel hydroxide, nickel phosphate, nickel phosphite, nickel formate, nickel sulfide, nickel molybdate, nickel tungstate, nickel oxide, nickel alloys such as nickel-molybdenum alloys, Raney nickel, or mixtures thereof.

In one embodiment with the addition of at least a Promoter metal, the weight ratio of the Promoter metal component (each individual Promoter metal component) to the Primary metal component is in any of the ranges: from 1 wt. % to 90 wt. %; from 2 wt. % to 50 wt. %; from 5 wt. % to 30%; and from 10 wt. % to 20 wt. %.

The slurry catalyst can also be prepared from a powder as metal precursor feedstock, e.g., rework material. In one embodiment, rework materials include catalyst fines generated in the making of (unsulfided) supported catalyst and/or unsupported (mixed Group VIII and Group VIB metal) catalyst precursors used for hydroconversion processes known in the art. In one embodiment, the rework material is generated from a supported catalyst precursor, e.g., pellets or extrudates with a porous refractory base such as alumina. In another embodiment, the rework material is from a re-generated or recycled particulate catalyst.

In one embodiment, rework materials for use as metal precursor feed comprise scrap/discarded/unused materials generated in any step of the preparation of (unsulfided) supported catalyst or bulk catalyst precursors. Rework can be generated from any of the forming, drying, or shaping of the catalyst precursors, or formed upon the breakage or handling of the catalyst precursor in the form of pieces or particles, e.g., fines, powder, and the like. In the process of making catalyst precursors, e.g., by spray drying, pelleting, pilling, granulating, beading, tablet pressing, bricketting, using compression method via extrusion or other means known in the art or by the agglomeration of wet mixtures, forming shaped catalyst precursors, rework material is generated.

Rework materials can also be generated from commercially available catalyst products, including but not limited to supported and self-supported catalyst such as ICR™ supported catalyst from Advanced Refining Technologies LLC, Nebula™ bulk catalyst from Albermale, or CRI™ NiMo alumina supported catalyst from Criterion Catalyst & Technologies, reduced to a size of less than 300 μm. In one embodiment, rework material consists essentially of unsulfided catalyst precursors, made with or without the use of diluents or binders such as alumina, silica alumina, cellulose and the like. In another embodiment, the rework material comprises the same material as used in the particulate catalyst, ground to a size of less than 300 μm.

In one embodiment, the rework material is prepared in a method as described in US Patent Application No. 20110306490, incorporated herein by reference in its entirety. The support material, e.g., alumina, iron oxide, silica, magnesia, titania, zeolite, etc., is first ground to particles of less than 300 μm. Catalytic materials, e.g., double metal precursors or single metal precursors such as ammonium heptamolybdate, or any soluble form of molybdenum, etc. are then deposited (impregnated) onto the ground base. The impregnated base is dried, then ground to a particle size of 1 to 300 μm. In one embodiment, the deposition of catalytic materials is followed by calcination so the catalytic materials sinter with the metal in the support to effect loading. The deposition of catalytic materials can be carried out more than once to maximize the catalyst loading, or different metal precursors can be deposited onto the ground support base at the same time or as different layers for multi-metallic catalyst fines.

In one embodiment, the rework material for use as metal precursor feed has an average particle size of less than 300 μm and greater than 1 μm. In a second embodiment, the average particle size is between 2-100 μm. In a third embodiment, in the range from 2 to 50 μm. The rework material can be ground, pulverized, or crushed to the desired particle size using techniques known in the art, e.g., via wet grinding or dry grinding, and using equipment known in the art including but not limited to hammer mill, roller mill, ball mill, jet mill, attrition mill, grinding mill, media agitation mill, etc.

Examples of supported and unsupported catalyst precursors and process for making thereof, for the subsequent generation of rework materials, are as disclosed in U.S. Pat. Nos. 2,238,851; 4,066,574; 4,341,625; 4,113,661; 5,841,013; 6,156,695; 6,566,296; 6,860,987; 7,544,285; 7,615,196; 6,635,599; 6,635,599; 6,652,738; 7,229,548; 7,288,182; 6,162,350; 6,299,760; 6,620,313; 6,758,963; 6,783,663; 7,232,515; 7,179,366; 6,274,530; US Patent Publication Nos. US20090112011A1, US20090112010A1, US20090111686A1, US20090111685A1, US20090111683A1, US20090111682A1, US20090107889A1, US20090107886A1, US20090107883A1, and US2007090024, the relevant disclosures with respect to the catalyst precursor and catalyst composition are included herein by reference.

Method for Making the Slurry Catalyst:

In one embodiment with the use of inorganic metal precursors as feedstock, a catalyst precursor is formed from the reaction of the inorganic metal precursors, followed by sulfiding with the addition of at least a sulfiding agent at a molar ratio of sulfur to metal ratio of at least 1.5:1 in one embodiment, at least 2:1 in a second embodiment, and at least 3:1 in a third embodiment. In yet another embodiment, the Primary metal precursor is first sulfided prior to the addition of the Promoter metal precursor (unsulfided), generating a promoted sulfided catalyst precursor. In another embodiment, a Primary metal precursor (unsulfided) is brought into contact with a sulfided Promoter metal precursor and the mixture may or may not be sulfided again to form a sulfided catalyst precursor. In yet another embodiment, the Primary metal precursor and the Promoter metal precursor(s) are separately sulfided and combined. In another embodiment without any Promoter metals, the Primary metal precursor feed is sulfided before transformation with a hydrocarbon diluent. The sulfiding step in one embodiment is carried out at a temperature from ambient to 300° F. for a period of up to 24 hours, and at a pressure from 0 to 3000 psig. The sulfiding agent can be any of hydrogen sulfide, ammonium sulfide solution, elemental sulfur, and in one embodiment, sour water before or after treatment.

In one embodiment, the water-based (sulfided or unsulfided) catalyst precursor is subject to a reduction step at temperatures above ambient with the introduction of at least a reducing agent, e.g., hydrogen, a hydrocarbon, etc. In another embodiment, the water based catalyst precursor after sulfiding is brought in contact with a hydrocarbon transforming agent ("diluent") and transformed from a water-based catalyst (hydrophilic) to an oil-based active catalyst (hydrophobic). In one embodiment, the weight ratio of the water-based catalyst to the hydrocarbon diluent ranges from 1:10 to 10:1. In a second embodiment, the weight ratio of the water-based catalyst to the hydrocarbon diluent ranges from 1:5 to 5:1. In a third embodiment, from 1:5 to 1:1. In yet another one embodiment, the ratio of water-based catalyst to hydrocarbon diluent ranges from 2:1 to 5:1. In another embodiment, the ratio ranges from 1:1 to 2:1. The nature of the hydrocarbon is not critical, and can generally include any hydrocarbon compound, acyclic or cyclic, saturated or unsaturated, un-substituted or inertly substituted, and mixtures thereof, which is liquid or solid at ambient temperatures. In one example, the hydrocarbon compound is derived from petroleum, including mixtures of petroleum hydrocarbons characterized as virgin naphthas, cracked naphthas, Fischer-Tropsch naphtha, light cat cycle oil, heavy cat cycle oil, and the like, typically those containing from about 5 to about 30 carbon atoms. In one embodiment, the hydrocarbon compound is a vacuum gas oil (VGO). In yet another embodiment, the diluent is a mixture of heavy oil and VGO.

In one embodiment, the sulfiding and/or the transformation step(s) can be eliminated by mixing a solution containing the metal precursor(s) directly with the heavy oil feed stock or a feedstock mixture (with a hydrocarbon diluent). The mixing can be at a high shear rate, for a dispersion of metal precursors in the heavy oil feed as an emulsion with droplets in sizes ranging from 0.1 to 300 µm. As heavy oil feedstock has available sulfur source for sulfidation and under sufficient conditions for the release of the sulfur source (e.g., $H_2S$), an emulsion of slurry catalyst can be formed when the metal precursor(s) are mixed directly with the heavy oil feedstock and become sulfided under appropriate conditions. In one embodiment, the in-situ sulfidation occurs under hydrotreating conditions, e.g., at a temperature ranging from 400° C. (752° F.) to 600° C. (1112° F.), and a pressure ranging from 10 MPa (1450 psi) to 25 MPa (3625 psi). In one embodiment, additional sulfiding agents can be added at the beginning of the process to get the in-situ sulfidation started. In another embodiment, additional sulfiding agents can be continuously or intermittently added to the in-situ sulfiding process with a heavy oil feedstock.

In one embodiment wherein a sulfur-containing organic solvent, e.g., DMSO, is employed in conjunction with the metal precursor feedstock, the sulfiding step can be omitted. The metal precursor/solvent mixture can be brought into contact directly with a hydrocarbon diluent or a heavy oil feed stock, and optionally a sulfiding agent, wherein a sulfided active slurry catalyst is generated.

In one embodiment with the use of rework materials for making the slurry catalyst, the rework material is combined with a diluent (carrier) and optionally, a sulfiding agent, e.g., $H_2S$, elemental sulfur, or ammonium sulfide, forming an unsulfided slurry catalyst (if no sulfiding agent added) or a sulfided slurry catalyst (if sulfiding took place) to be injected into the ebullated bed reactor. The diluent for use with the rework materials in one embodiment is a hydrocarbon diluent (as used as a transforming agent with the water-based slurry catalyst made from metal precursor feed) e.g., VGO, cycle oil, gasoline, distillate, naphtha, light cycle oil, benzene, toluene, xylene, diesel oil, heptane, etc. In another embodiment, water itself can be used as the carrier. In another embodiment, the rework materials can be slurried directly in a heavy oil feedstock, or a mixture of a heavy oil feedstock and hydrocarbon diluent, forming a sulfided slurry catalyst ex-situ prior to feeding to the ebullated bed reactor. In yet another embodiment, the rework materials are slurried directly in the heavy oil feedstock under sufficient sulfiding conditions for in-situ sulfiding to take place, generating a sulfided slurry catalyst in the ebullating bed reactor.

In one embodiment, a sufficient amount of rework material is employed as a powder in an amount sufficient for the formation of the slurry catalyst, and to provide a slurry catalyst dosage of 5 to 5000 ppm Primary metal (e.g., Mo) to total heavy oil feedstock. The amount of powder (rework materials) ranges from 2 to 60 wt. % of total weight of the hydrocarbon diluent and/or heavy oil feedstock in one embodiment; 5 to 40 wt. % in a second embodiment; less than 1 wt. % in a third embodiment for a low Primary metal dosage; and a sufficient amount of rework material is used for a dosage ranging from 20 to 1000 ppm of Primary metal to heavy oil feedstock to the ebullating bed system in a fourth embodiment. In another embodiment, a sufficient amount of rework material is used for a dosage of 5 to 100 ppm Primary metal to heavy oil feedstock.

The slurry catalyst in one embodiment may optionally comprise other components including but not limited to pore forming agents, emulsifier agents, surfactants, sulfur additives, sulfiding agents, stabilizers, binder materials, phosphorus compounds, boron compounds, additional transition metals, rare earth metals or mixtures thereof, depending on the envisaged catalytic application. The optional components may be added to the slurry catalyst directly, or added to the diluent/carrier for subsequent mixing with the rework material/catalyst precursor.

In one embodiment, the slurry catalyst to the dual catalyst system comprises solely of a slurry catalyst made from metal precursor reagents as feedstock and pre-sulfided. In another embodiment, the slurry catalyst comprises solely of a catalyst made from rework materials, provided to the system as a ground catalyst. In another embodiment, the rework materials are dispersed in a hydrocarbon diluent or other suitable liquid carrier and introduced to the system as an unsulfided slurry catalyst, subsequently sulfided in-situ upon contact with the heavy oil feedstock under sulfiding conditions. The rework materials can also be introduced to the ebullating bed system in a pre-sulfided form as a slurry catalyst.

In one embodiment, the slurry catalyst comprises slurry catalyst made from rework materials as well as metal precursor reagents, at a weight ratio ranging from 5:95 to 95:5, with the weight ratio of slurry catalyst from rework materials to slurry catalyst from metal precursor reagents varying depending on various factors, including the type of heavy oil feedstock to be processed, operating conditions of the system, availability of supplies, etc.

Properties of the Slurry Catalyst.

The slurry catalyst is generally sized to remain entrained in at least a portion of the fluid that is upflowing through the ebullated bed reaction zone, with a sufficient size range to facilitate removing the catalyst from a product liquid using filtering. The slurry catalyst has an average particle size of greater than 1 µm and less than 500 µm in one embodiment; in a range from 1 to 300 µm in a second embodiment; at least 5 µm in a third embodiment; in a range from 5 to 70 µm in a fourth embodiment; in a range from 5 to 50 µm in a fifth embodiment; and in a range from 2 to 30 µm in a sixth embodiment.

The slurry catalyst is characterized as having an internal pore volume that significantly increases the effectiveness of the dual catalyst system in the heavy oil upgrade process. The slurry catalyst has a pore volume of greater than 0.4 $cm^3$ per gram ($cm^3/g$) of catalyst in a solid form in one embodiment; greater than 0.6 $cm^3/g$ in a second embodiment; greater than 0.8 $cm^3/g$ in a third embodiment; greater than 1.2 $cm^3/g$ in a fourth embodiment; in the range from 0.4 $cm^3/g$ to 1.8 $cm^3/g$ in a fifth embodiment; and in the range from 0.6 $cm^3/g$ to 1.5 $cm^3/g$ in a sixth embodiment.

In one embodiment, the slurry catalyst is characterized as having a polymodal pore distribution with at least a first mode having at least about 80% pore sizes in the range from 5 to 2,000 Angstroms in diameter, a second mode having at least about 70% of pore sizes in the range from 5 to 1,000 Angstroms in diameter, and a third mode having at least 20% of pore sizes of at least 100 Angstroms in diameter. As used herein, polymodal includes bimodal and higher modal. In one embodiment, at least 30% of pore sizes are >100 Angstroms in diameter. In another embodiment, at least 40%. In yet another embodiment, at least 50% are in the range from 50 to 5000 Angstroms in diameter. In one embodiment, the slurry catalyst (made from metal precursor feed) is characterized as having at least 65% of the pore volume ranging from 100 to 1000 Angstroms.

In one embodiment, the slurry catalyst is characterized as having a relatively high total surface area, as determined by the nitrogen BET method, of at least 100 m²/g (of catalyst). In one embodiment, the surface area is at least 200 m²/g. In another embodiment, the surface area is from 200 to 900 m²/g. In a fourth embodiment, it is from 50 to 800 m²/g. In a fifth embodiment, from 100 to 400 m²/g. In a sixth embodiment, from 300 to 800 m²/g. In a seventh embodiment, the slurry catalyst has a surface area of at least 300 m²/g.

The slurry catalyst comprises 0.5 wt. % to 50 wt. % of at least a Primary metal, such as molybdenum (based on solid weight) in one embodiment; from 1 wt. % to 45 wt. % molybdenum in a second embodiment; or from 3 wt. % to 40 wt. % molybdenum in a third embodiment.

In one embodiment of a slurry catalyst prepared from metal precursor feedstock, the slurry catalyst (as a multi-metallic or single metal catalyst) is of the formula $(M^r)_a(L^u)_b(S^v)_d(C^w)_e (H^x)_f(O^y)_g(N^z)_h$, wherein M is a Primary metal selected from Group VIB metals, non-noble Group VIII metals, Group IIB metals; L is optional as a Promoter metal and L is a metal that is different from M, L is at least one of a Group VIII metal, Group VIB metal, Group IVB metal, and Group IIB metal; $b \geq 0$; $0 = <b/a = <5$; $0.5(a+b) <= d <= 5(a+b)$; $0 <= e <= 11(a+b)$; $0 <= f <= 18(a+b)$; $0 <= g <= 5(a+b)$; $0 <= h <= 3(a+b)$; t, u, v, w, x, y, z, each representing total charge for each of: M, L, S, C, H, O and N, respectively; and $ta+ub+vd+we+xf+yg+zh=0$. In one embodiment of a multi-metallic slurry catalyst, the Primary metal M is molybdenum and the Promoter metals are nickel and titanium. In another embodiment, the slurry catalyst is single metallic with nickel as the Primary metal M. In yet another embodiment, the Primary metal M of the single metallic slurry catalyst is molybdenum.

Slurry Catalyst Addition:

In the dual catalyst system, the slurry catalyst is provided as a single addition of slurry catalyst to the reaction zone in one embodiment, or as an intermittent addition to the reaction zone in a second embodiment, or as a continuous addition to the reaction zone over an extended time period in a third embodiment. Intermittent addition may be done periodically, or on an as needed basis. In one embodiment, intermittent addition includes dosing the reaction zone with high levels of the slurry catalyst, and then operating the reaction zone without added slurry catalyst until the amount of slurry catalyst in the recirculating liquid reaches a specified minimum amount within the reaction zone before repeating the addition of slurry catalyst. The slurry catalyst can be provided at a constant addition rate or at a varying addition rate depending on the operating conditions, e.g., the properties of the heavy oil feedstock, run time, etc., amongst other factors.

The slurry catalyst is added to the ebullated bed system as a liquid phase slurry. The liquid phases includes a carrier fluid, such as an aqueous phase, the heavy oil feedstock, or a hydrocarbon diluent, e.g., hydrocarbons boiling in the heavy diesel range or the LVGO range, including a boiling range from 400° to 700° F., or a full VGO range boiling from 650-950° F. In one embodiment, the slurry catalyst is prepared by combining rework material with the carrier fluid. In another embodiment, the slurry catalyst is prepared in a liquid phase from catalyst precursor materials.

In one embodiment, the slurry catalyst is supplied to the reaction zone, where it is combined with the heavy oil feedstock in the reaction zone, at a temperature range from ambient temperature to the reaction temperature within the reaction zone. In one embodiment, the supplied slurry catalyst is supplied to the reaction zone at a temperature in the range from 50° F. to 850° F. Slurry catalyst supplied at an elevated temperature may be preheated prior to introduction to the reaction zone. In one embodiment, at least a portion of the slurry catalyst passes through a preheat furnace prior to introduction to the reaction zone. In one embodiment, at least a portion of the slurry catalyst is preheated by addition of a hot media, such as heated hydrogen, heated carrier fluid or heated heavy oil feedstock, prior to introduction to the reaction zone.

In one embodiment, at least a portion of the slurry catalyst is supplied to at least a portion of the heavy feedstock prior to introduction to the reaction zone. In general, the heavy oil feedstock is preheated prior to introduction to the reaction zone, and is introduced to the reaction zone at a temperature up to and including the reaction temperature in the reaction zone. In one embodiment, the heavy oil feedstock is introduced at a temperature that is somewhat lower than the reaction zone temperature, in order to absorb exothermic heat that is generated from the exothermic reactions occurring in the reaction zone. In one embodiment, the slurry catalyst is added to the heavy oil feedstock prior to preheating the heavy oil feedstock; the slurry catalyst/heavy oil feedstock mixture is thus preheated together to a desired elevated temperature. In one embodiment, the slurry catalyst is provided to the preheated heavy oil feedstock, and the mixture is introduced to the reaction zone.

In one embodiment, the slurry catalyst is presulfided, such that additional sulfur addition to the catalyst is not required for the catalyst to possess sufficient catalytic activity for the desired reactions in the reaction zone. In embodiments, the slurry catalyst comprises molybdenum and sulfur in the atomic ratio Mo/S within the range from 1/1 to 1/3 prior to introduction to the reaction zone. In one embodiment, the slurry catalyst is provided to the reaction zone in a sulfur containing fluid, such that the slurry catalyst is sulfided prior to or during introduction to the reaction zone.

A sufficient amount of slurry catalyst is introduced into the dual catalyst system for a total solid concentration in heavy oil feedstock ranging from 5 to 1000 ppm in one embodiment; from 5 to 700 ppm in a second embodiment; and from 10 to 500 ppm in a third embodiment. In one embodiment wherein rework is employed, the total solid concentration ranges from 50-500 ppm. In another embodiment, the total solid concentration ranges from 10 to 300 ppm.

In terms of catalytically active materials (e.g., Primary metal precursor such as Mo), a sufficient amount of slurry catalyst is supplied for a Primary metal concentration ranging from 5 to 1000 ppm of Primary metal in heavy oil feedstock in one embodiment; from 10 to 750 ppm in a second embodiment; from 25 to 500 in a third embodiment; and 50 to 250 ppm in a fourth embodiment. In one embodiment wherein rework is employed, the Primary metal concentration ranges from 5 to 500 ppm.

Hydroprocessing Operation with Dual Catalyst System:

Much of the beneficial upgrading reactions occur within the expanded catalyst zone, where the heavy oil feedstock containing the slurry catalyst contacts the particulate catalyst in the presence of hydrogen, at suitable reaction temperatures. In one embodiment, upgrading reaction conditions within the expanded catalyst zone include a temperature in the range from 204° to 482° C. (400° to 900° F.) and a pressure within a range from 500 to 5000 psig (pounds per square inch gauge) (3.5-34.6 MPa). In one embodiment, the upgrading reaction temperature is in the range from 315° to 480° C. (600° to 900° F.), or in the range from 370° to 480° C. (700° to 900° F.) or in the range from 390° to 450° C. (740° to 840° F.). In one embodiment, upgrading reaction conditions within the expanded catalyst zone include a pressure from 1000 psig to 3500 psig (7.0-24.4 MPa). In carrying out the upgrading process, hydrogen is usually provided to the expanded catalyst zone within the range from 2000 to 10,000 standard cubic feet (scf) per barrel of feedstock, the overall hydrogen consumption being in the range from 300 to 2000 scf per barrel of liquid hydrocarbon feed (53.4-356 m$^3$ H$_2$/m$^3$ feed).

The ebullated bed heavy oil system with the dual catalyst feed type is particularly suitable for upgrading certain types of heavy oil under conditions, wherein the catalysts deactivate rapidly due, for example, to coke and metals deposition on the catalyst. Such a system is also particularly effective for higher temperature and higher conversion operations. During operation of the ebullated bed heavy oil processing system for upgrading heavy oil, the heavy oil is heated to a temperature at which the heavy oil molecules within the feedstock tend to undergo thermal cracking to form free radicals of reduced chain length. These free radicals have the potential of reacting with other free radicals to produce coke precursors and sediment within the reactor. It is one function of catalysts within the system to react with the free radicals, forming stable molecules of reduced molecular weight and boiling point.

In conventional ebullated bed heavy oil processing systems, there are several zones in which the heated heavy oil is not in contact with a catalyst. For example, the heavy oil is heated to reaction temperature in a heating zone external to the reaction zone. It then passes from the heating zone through a feed port into the reactor, through the plenum chamber below the expanded catalyst zone, through the distributor plate supporting the expanded catalyst zone, and upward through the expanded catalyst zone. Within the plenum chamber and within the disengagement zone, at least, the heavy oil is at a high temperature but without the benefit of a porous supported catalyst, such as the particulate catalyst. Even the expanded catalyst zone has regions of higher catalyst density, and regions of lower catalyst density. In these lower density regions, the heavy oil has an increased tendency to form free radicals which tend to react with other free radicals to form sediment before these free radicals contact with a catalyst particle and get deactivated. Upgraded heavy oil then passes from the expanded catalyst zone to the disengagement zone at temperatures which are sufficiently high to cause the heavy oil to form additional free radicals. In the absence of catalyst, these additional free radicals tend to react with other free radicals, to form additional sediment or coke precursors.

With the use of the dual catalyst system, and particularly with the slurry catalyst having a high pore volume, a high surface area and an average particle size of at least 1 μm, the use of the slurry catalyst allows an increase in the conversion of the heavy oil while reducing the formation of coke precursors and sediment in high temperature regions within the reaction zone. The slurry catalyst is sized to be carried with the flowing heavy oil in the ebullated bed heavy oil processing system, and thus to distribute in the hydrocarbonaceous liquid through the ebullated bed reaction zone, including the feed inlet port, the lower region, the expanded catalyst zone and the upper region. In at least the feed inlet, the plenum chamber, and the disengagement zone, the slurry catalyst is the sole catalyst for suppressing sediment formation. In the expanded catalyst zone, the slurry catalyst maintains catalytic activity in regions of lower particulate catalyst density, and provides additional reactivity to control sediment formation.

The slurry catalyst provides additional catalytic hydrogenation activity, both within the expanded catalyst zone, the recirculation conduit and the upper and plenum chambers. The effect of the slurry catalyst capping free radicals outside of the particulate catalyst minimizes formation of sediment and coke precursors, which are often responsible for deactivating the particulate catalyst. This has the effect of reducing the amount of particulate catalyst that would otherwise be required to carry out a desired hydroprocessing reaction. It also reduces the rate at which the particulate catalyst must be withdrawn and replenished. The use of the slurry catalyst reduces the formation of sediment and coke precursors at least 10% over an ebullating bed system without the slurry catalyst in one embodiment; at least 20% in a second embodiment, and at least 25% in a third embodiment.

Addition of the slurry catalyst to the ebullated bed reaction zone significantly increases the operational flexibility when operating the upgrading process within the reaction zone. In one aspect, the addition rate of the slurry catalyst can vary over a wide range, depending on requirements of the specific use of the process, without affecting the overall operability of the process. In another aspect, even a relatively low addition rate of the slurry catalyst has a significant effect on the product quality of the upgraded heavy oil that is recovered from the process. In terms of the hydrogenation component distribution between the particulate catalyst and the slurry catalyst in the ebullated bed reaction zone, less than 50% by weight of the hydrogenation component (e.g. molybdenum) in the reaction zone is associated with the slurry catalyst. In one embodiment, 1 wt. % to 50 wt. % of the hydrogenation component in the ebullated bed reaction zone is associated with the activity of the slurry catalyst.

One benefit realized from controlling or reducing sediment in the upgraded heavy oil is to avoid fouling in downstream equipment, including separation vessels, distillation columns, heat exchangers, and the like, in addition to meeting upgraded heavy oil product specifications. In one embodiment, use of the slurry catalyst can provide added operational flexibility. In some conventional ebullated bed processes without the use of slurry catalyst, operating conditions are controlled to at least some extent by the capabilities of downstream processing equipment for handling sediment and coke precursors in the upgraded heavy oil from the ebullated bed process. Use of the slurry catalyst as described herein suppresses the formation of sediment and coke precursors. In turn, this will also improve some of the other product qualities depending on the conditions.

One suitable response to the decreased sediment formation is to increase the reaction temperature in the ebullated bed reaction zone to increase conversion of the heavy oil to produce a lighter, more valuable product mix of an upgraded product. Increased conversion will also improve other product qualities, depending on the features of a specific embodiment of the process. Since increasing the reaction temperature increases the amount of sediment and coke precursors in the product, the temperature increase is selected to increase the amount of sediment and coke precursors in the upgraded product back to the original amount. The net effect is an increase in conversion, with no increase in the sediment load to downstream processing. Often, ebullated bed reaction zone temperatures are increased in the range from 5° to 15° C. as the result of using slurry catalyst in the reaction zone.

In one embodiment, the heavy oil dual catalyst processing system includes multiple ebullated bed reaction zones. Each reaction zone after the first receives at least a portion of the upgraded heavy oil product from the previous reaction zone. Any reaction zone that operates with addition of the slurry catalyst will produce an upgraded product containing slurry catalyst. In one embodiment, this upgraded product with slurry catalyst is passed to the next reaction zone in the series (if available).

Use of the multiple ebullated bed reaction zone system provides the opportunity to select any or all of the reaction zones for introduction of the slurry catalyst. In one embodiment, the slurry catalyst is supplied, in combination with a heavy oil feedstock, to the first reaction zone. Reaction products, including converted heavy oil, along with at least a portion of the slurry catalyst, are passed to a subsequent reaction zone. In some such embodiments, the heavy oil feedstock and the slurry catalyst are supplied to the first reaction zone only. In other embodiments, either additional heavy oil feedstock, slurry catalyst, or both, are also supplied to subsequent reaction zones. In one embodiment, a heavy oil feedstock is supplied to the first reaction zone, without addition of a slurry catalyst. A slurry catalyst is supplied to a subsequent reaction zone, either into a second reaction zone and/or into a reaction zone after the second (if any). In a specific example, the heavy oil processing system includes three ebullated bed reaction zones. The second reaction zone is selected for introduction of the slurry catalyst. Upgraded liquid product from the second reaction zone, that contains slurry catalyst, is passed to the third reaction zone for continued upgrading. The slurry catalyst provides added benefit in the third reaction zone. Alternatively, the slurry catalyst is introduced solely to the third reaction zone in the three reaction zone system. The slurry catalyst is particularly effective in reducing sediment and coke precursors in the upgraded product from the third reaction zone, since many of the most active coke precursors have been converted in the first and second reaction zones. Those coke precursors that are generated in the third reactor are more easily suppressed; the slurry catalyst provides a significantly larger benefit in effectively removing those coke precursors.

Reference is now made to one embodiment of the hydroconversion reaction zone and the process for upgrading a heavy oil feedstock, as illustrated in FIG. 1. In FIG. 1, an ebullated bed heavy oil system comprises a heavy oil feed supply 12, a hydrogen supply 14, a slurry catalyst supply 18, at least one feed preheater 46, a slurry catalyst conditioning unit 48 and at least one feed inlet port 16. In an embodiment of the process, a reaction mixture comprising heavy oil feedstock 12, hydrogen 14, and slurry catalyst 18 is introduced into the ebullated bed reaction zone 10. The ebullated bed reaction zone comprises a plenum chamber 24, an expanded catalyst bed 20, and a disengagement zone 30. The plenum chamber is generally a lower region within the hydroconversion reaction zone and below the expanded catalyst bed or zone. The disengagement zone is generally an upper region within the hydroconversion reaction zone and above the expanded catalyst bed or zone. Hydrogen from hydrogen supply 14 is combined with heavy oil feedstock from heavy oil feedstock supply 12 and heated in preheater 46. Slurry catalyst from slurry catalyst supply 18 is combined with a carrier fluid in 48 to make a catalyst slurry, and mixed with the heated heavy oil feedstock and hydrogen blend, and the combination is provided to the ebullated bed reaction zone 10 through feed inlet port 16. Exemplary carrier fluids that are useful for forming the catalyst slurry include but are not limited to hydrocarbons boiling in the heavy diesel range or the LVGO range, including a boiling range from 400° to 700° F., or a full VGO range boiling from 650-950° F., toluene, cycle oil, and even water for a slurry catalyst made from rework materials. In one embodiment, the slurry catalyst is presulfided.

In other embodiments (not shown), hydrogen from hydrogen supply 14 and heavy oil feed from heavy oil feed supply 12 are heated in separate preheaters. Each heated stream is provided individually to the ebullated bed reaction zone, or the heated streams are combined before being provided to the ebullated bed reaction zone 10. In one embodiment, the slurry catalyst is provided directly to the ebullated bed reaction zone through a separate slurry catalyst supply port, or the slurry catalyst is blended with the heated hydrogen and/or the heated heavy oil feedstock before being passed to the ebullated bed reaction zone. In all cases, the reaction mixture comprising the heated hydrogen, heated heavy oil, and slurry catalyst is blended with the hydrocarbonaceous liquid within the plenum chamber 24 of the ebullated bed reaction zone.

The reaction zone further includes an expanded catalyst zone 20 comprising particulate catalyst that is maintained in an expanded or fluidized state against the force of gravity by upward movement of feedstock and gas through the ebullated bed reaction zone. The lower end of the expanded catalyst zone is defined by a distributor grid plate 22, which separates the expanded catalyst zone 20 from plenum chamber 24. The distributor grid plate distributes the hydrogen gas and upgraded heavy oil evenly across the reactor and prevents the particulate catalyst from falling by the force of gravity into the plenum chamber. The top of the expanded catalyst zone is the height at which the downward force of gravity begins to equal or exceed the uplifting force of the upwardly moving upgraded heavy oil and gas through the ebullated bed reaction zone as the particulate catalyst reaches a given level of expansion or separation. A disengagement zone 30 is separated from expanded catalyst zone 20 by interface 28. The design of the disengagement zone 30 is based on separating the particulate catalyst from the hydrocarbonaceous liquid. The design is also based on achieving a separation of gas and liquid so that the recirculated fluid is mostly or completely liquid while the fluid exiting the reaction zone through upgraded heavy oil withdrawal port 44 is the net liquid product and net product gas. Some of the hydrocarbonaceous liquid in the disengagement zone is recirculated back to the plenum chamber of the ebullated bed reaction zone, and some of the hydrocarbonaceous liquid, unreacted hydrogen and gaseous reaction products are removed through product withdrawal port 44 from the disengagement zone for further processing outside of the ebullated bed reaction zone. At least a portion of the hydrocarbonaceous liquid in the disengagement zone 30 is free of particulate catalyst.

Heavy hydrocarbonaceous liquid within the ebullated bed reaction zone is continuously recirculated from the disengagement zone 30 above the expanded catalyst zone to the plenum chamber 24 below the expanded catalyst zone by means of a recirculation conduit 36 disposed in the center of the ebullated bed reaction zone in communication with a circulation pump 34 disposed at the bottom of the ebullated bed reaction zone. At the top of the recirculation conduit 36 is a funnel-shaped recirculation receiver 38 through which hydrocarbonaceous liquid is drawn from the disengagement zone 30. The hydrocarbonaceous liquid drawn into the recirculation conduit is effectively, or completely, free of particulate catalyst, though the liquid contains a portion of the slurry catalyst within the reaction zone. The upgraded heavy oil drawn downward through the recirculation conduit enters the plenum chamber 24, where it is combined with the feedstock, hydrogen gas and slurry catalyst entering the ebullated bed reaction zone through the input port 16. The combination then passes up through the distributor grid plate 22 and into the expanded catalyst zone 20. Continuously circulating blended heavy oil upward through the ebullated bed reaction zone advantageously maintains the particulate catalyst in the expanded catalyst zone in an expanded or fluidized state within the expanded catalyst zone, minimizes channeling, controls reaction rates, and keeps heat released by the exothermic hydrogenation reactions to a safe level.

Particulate catalyst is introduced into the ebullated bed reaction zone through a catalyst supply port 40 that passes through the top of the ebullated bed reaction zone and into the expanded catalyst zone. The particulate catalyst that is introduced may be freshly made, it may be partially deactivated catalyst that is recovered from an upgrading process, including the present process, or it may be a combination of the two, in any proportion. The particulate catalyst may be presulfided. Particulate catalyst is withdrawn from the expanded catalyst zone through a catalyst withdrawal port 42 that passes from a lower end of the expanded catalyst zone. Particulate catalyst that is withdrawn will generally include a range from catalytic qualities, including catalyst that has varying amounts of remaining activity and catalyst that is completely spent, with no remaining catalytic activity.

The slurry catalyst which is provided to the reaction zone is of a size such that it is carried from the plenum chamber 24, through the expanded catalyst zone 20 by the upflowing heavy oil and hydrogen and into the disengagement zone 30. In effect, the catalyst is subjected to the same amount of backmixing and recirculation as the heavy oil. Thus, the slurry catalyst is distributed throughout the hydrocarbonaceous liquid ebullated bed reaction zone.

EXAMPLES

The following illustrative examples are intended to be non-limiting.

Example 1

A commercially available particulate catalyst from Advanced Refining Technology (ART) was provided as a particulate catalyst. The particulate catalyst had a nominal cross-sectional diameter of 0.04 inch and a length of 0.1 inch to 0.4 inch, and contained 10% by weight molybdenum and 5% by weight nickel on an alumina base. Properties of the particulate catalyst are listed in Table 1.

TABLE 1

|  | Particulate Catalyst | Rework Material |
|---|---|---|
| Molybdenum content, wt. % | 10 wt. % | 10 wt. % |
| Nickel content, wt. % | 5 wt. % | 5 wt. % |
| Surface Area, m2/g | 288 m2/g | 288 m2/g |
| Pore Volume (by mercury porosimetry) | 0.724 cm$^3$/g | 0.724 cm$^3$/g |
| Mesopore Volume (by mercury porosimetry in 100-300 A range) | 0.162 cm$^3$/g | 0.162 cm$^3$/g |

Example 2

The particulate catalyst was dried for 1 hour under nitrogen at 400° F. A 1% dimethyldisulfide (DMDS) solution in heptane was injected for 1 h at 350° F. and at a pressure of 300 psi before ramping the temperature to 450° F. Sulfiding was maintained for 14 hours at these conditions before introducing a 6% DMDS solution and increasing pressure to 800 psi followed by ramping to 650° F., where the temperature was maintained for 2 hours.

Example 3

A sample of the particulate catalyst of Example 1 was ground, and the fraction that passed through a standard 650 mesh screen was collected as rework material. Properties of the rework material are listed in Table 1.

An unsulfided catalyst slurry containing 92 grams of the rework material and 7562 grams of the diluent blend having properties listed in Table 2 was prepared.

Example 4

Comparative

A heavy oil feedstock, in the ratio 94.2 g/h vacuum residuum and 8.0 g/h diluent (Table II), was provided to the ebullated bed pilot plant having a total reactor volume of 372 cm$^3$ at an average feed rate of 0.27 volumes of feed per volumes of catalyst per hour, a temperature of 790° F. and a pressure of 2400 psig. The pilot plant employed the particulate catalyst of Example 2. At these operating conditions, the conversion was found to be 70.8%, and the liquid product from the reaction zone contained 3026 ppm sediment by the Shell Hot Filtration Test (Van Kerkvoort, W. J. and Nieuwstad, A. J. J. Journal of the Inst. of Petroleum (1951) 37, pp. 596-604).

TABLE 2

| Analysis | Vacuum Residuum | Diluent Blend |
|---|---|---|
| S, wt % | 3.1 | 0.6 |
| N, ppm | 6590 | 1382 |
| C, % | 85.2 | 84.1 |
| H, % | 10.5 | 11.0 |
| MCR, % | 17.5 | 7.4 |
| Asphaltenes, wt. % | 5.4 | 2.2 |
| API | 7.4 | 2.1 |
| Density, g/cc | 1.02 | 1.06 |
| 1000+ F., wt % | 90 | 0.54 |
| Ni, ppm | 66 | — |
| V, ppm | 214 | — |

Example 5

A heavy oil feedstock, in the ratio of 93.6 g per hour of the vacuum residuum of Table I and the unsulfided slurry catalyst of Example 3 was provided to the ebullated bed pilot plant of Example 2 at an average feed ratio of 0.27 volumes of heavy oil feedstock per volume of catalyst per hour and at a temperature of 790° F. and a pressure of 2400 psig. At these operating conditions, the conversion was found to be 69.9% and the liquid product from the reaction zone contained 1372 ppm sediment. It was observed that the use of the ground catalyst, while having little measurable effect on the overall conversion, significantly decreased the amount of sediment that was formed.

Example 6

Example 5 was repeated at a temperature of 797° F. The conversion was found to be 74.2%, and the liquid product from the reaction zone contained 1825 ppm sediment. As shown, the amount of sediment formed using the ground slurry catalyst remained low, even at higher temperatures and higher amounts of conversion.

Example 7

Example 5 was repeated at 805° F. The conversion was found to be 77.9%, and the liquid product from the reaction zone contained 3058 ppm sediment. The reaction temperature was raised significantly with a substantial increase in conversion, before sediment formation reached the level measured for the test without the slurry catalyst.

Example 8

A Mayan vacuum residuum feedstock having a boiling point range from greater than 1000° F. was contacted with a finely ground supported catalyst having a mean particle size of 45 microns and comprising molybdenum supported on an alumina base for 7 hours at 815° F. and 2500 psi $H_2$ pressure. The results are tabulated in Table 3, showing the slurry catalyst was effective for upgrading the heavy oil residual material.

TABLE 3

| Catalyst Tested | Ground Supported Catalyst |
|---|---|
| Total catalyst Solids, % of VR Feed | 6.4 |
| Catalyst Dosage, ppm molybdenum/VR feed | 1000 |
| Product API Gravity | 28 |
| Sulfur Conversion, % of Feed | 95.4 |
| VR conversion, % of Feed | 94.5 |
| MCR conversion, % of Feed | 89.6 |
| Asphaltene conversion, % of feed | 93.3 |

Example 9

In this example, a slurry catalyst with a Ni:Mo weight ratio of about 10% was made. 33.12 g of ammonium heptamolybdate tetrahydrate $((NH_4)_6Mo_7O_{24})$ was dissolved in 100 g of water in a glass vessel fitted with an overhead mechanical stirrer, and 14.1 g of concentrated ammonia solution (28 wt. % $NH_4OH$ in $H_2O$) was added. A solution of 8.1 g of nickel sulfate hexahydrate ($NiSO_4.6H_2O$) in 32 g of water was added to the first solution, all at ambient temperature, producing an emerald-green suspension. This suspension was heated to 70° C. under atmospheric pressure, and 101 g of ammonium sulfide (($NH_4)_2S$) solution in water (40-44 wt. %) was added slowly, over the course of 45 minutes. After that, the mixture was heated with stirring for an additional 60 minutes. The volume of the reaction mixture was reduced in half on a rotary evaporator. The resulting water-based catalyst precursor was transformed to a final oil-based catalyst with VGO and hydrogen in a pressure test autoclave.

Example 10

A duplicate of Example 5 is carried out, but instead of using a ground catalyst for the slurry catalyst, the slurry catalyst of Example 9 is employed. It is expected that the use of the slurry catalyst substantially reduces the amount of sediment formed, and provides at least equivalent if not better conversion for use in a system without the addition of the slurry catalyst.

Example 11

A sample of the particulate catalyst of Example 1 was ground to an average particle size of 37 microns and collected as rework material, then mixed with a sufficient amount of VGO for a slurry catalyst (unsulfided) with a concentration of about 1.5 wt. % Mo in VGO.

Example 12

The slurry catalyst of Example 9 (Ni:Mo of 10 wt. %) was compared with the unsulfided slurry catalyst of Example 11 in a heavy oil upgrade reactor system using a VR feedstock having properties including: API—2.7; S—5.12 wt %; N—7900 ppm; C—83.24 wt %; H—9.53 wt %; Asph—25.7 wt %; MCR—29.9 wt %; 1000 F+—95.7 wt %; Ni—141.9 ppm; and V—671.6 ppm. The system has 3 reactors in series, with the effluent stream from the first reactor comprising upgraded products, the slurry catalyst, hydrogen containing gas, and unconverted heavy oil feedstock being to the second and then third reactor in series for further conversion. The runs were made at about 815° F., 2500 psig H2 and residence time of about 7 hrs. Results are shown in Table 4, showing better performance and with lower dosage of Mo catalyst when rework material is used to prepare the slurry catalyst.

TABLE 4

| Catalyst Tested/Results | Slurry catalyst Example 9 | (Unsulfided) Slurry catalyst from rework - Example 11 |
|---|---|---|
| Total catalyst Solids, % of VR Feed | 5.5 | 6.4 |
| Catalyst Dosage, ppm Moly on VR | 4000 | 1000 |
| Product API Gravity | 27.4 | 28 |
| Sulfur Conversion, % of Feed | 92.5 | 95.4 |
| VR conversion, % of Feed | 93.4 | 94.5 |
| MCR conversion, % of Feed | 87.4 | 89.6 |
| Asphaltene conversion, % of feed | 90.8 | 93.3 |

Example 13

A slurry catalyst similar to the slurry catalyst of Example 9 was prepared from metal precursor feed, except that the amount of nickel sulfate precursor used was increased for a Ni:Mo ratio of about 23 wt. %. The slurry catalyst has a surface area of 157 $m^2/g$, TPV of 0.358 cc/g; PV (<100 A) of 0.1324 cc/g; PV (>100 A) of 0.2256 cc/g; and PV (25-1000 A) of 0.264 cc/g.

Example 14

A slurry catalyst was prepared according to the procedures listed in U.S. patent application Ser. No. 13/331,660 (now U.S. Pat. No. 8,809,223) of the same filing date, incorporated herein by reference. In the procedures, the catalyst was prepared from water-soluble Mo metal precursor in solution with a pH of at least 4, with a water-soluble Ni salt as a promoter, for a Ni:Mo ratio of 23%. The water-based catalyst precursor was transformed in a VGO diluent forming a slurry catalyst The slurry catalyst has excellent porosimetry properties including a surface area of 221 $m^2/g$; total pore volume of 0.836 cc/g, PV (<100 A) of 0.1892 cc/g, PV (>100 A) of 0.6468 cc/g; and PV (25-1000 A) of 0.71 cc/g.

Example 15

The slurry catalyst of Example 13 (high Ni:Mo of 23 wt. %) was compared with the slurry catalyst in Example 14 with improved porosimetry properties. The catalysts were used to upgrade a heavy oil feedstock in a reactor system similar to Example 12. The results are shown in Table V, showing better performance for Example 14 at a substantially lower dosage of catalyst.

TABLE V

| Conversion | Slurry catalyst Example 13 | Slurry catalyst with improved porosimetry Example 14 |
|---|---|---|
| Mo/VR concentration | 3000 ppm | 1500 ppm |
| Sulfur, % | 80.93 | 81.17 |
| Nitrogen, % | 38.99 | 38.47 |
| MCR, % | 72.95 | 75.68 |
| VR (1000 F.+), % | 88.34 | 88.81 |
| HVGO (800 F.+), % | 75.08 | 76.29 |
| VGO (650 F.+), % | 58.61 | 60.23 |
| HDAs, % | 66.43 | 76.38 |

Example 16

A duplicate of Example 5 is carried out, but instead of using a ground catalyst, the slurry catalyst of Example 15 with improved porosimetry is employed instead. It is expected that the use of the slurry catalyst with improved porosimetry properties (at a similar Mo/VR concentration) to substantially reduce the amount of sediment formed, and provide equivalent if not better conversion rates for use in a system without the addition of the slurry catalyst.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

Features are described in terms of ranges, every integral or fractional numerical value falling between the end points of the ranges, including the end points of the ranges are fully within the scope of the stated range.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. While numerous changes may be made by those skilled in the art, such changes are encompassed within the spirit of this invention as defined by the appended claims.

Furthermore, no limitations are intended to the details of construction or design herein shown, other than as described in the claims below. It is therefore evident that the particular illustrative embodiments disclosed above may be altered or modified and all such variations are considered within the scope and spirit of the present invention. The terms in the claims have their plain, ordinary meaning unless otherwise explicitly and clearly defined by the patentee.

The invention claimed is:

1. A dual catalyst system for use in a heavy oil upgrade process, the catalyst system comprises:
 a particulate catalyst for use in an expanded catalyst zone of an ebullated bed reactor to produce an upgraded heavy oil;
 a pre-sulfided catalyst precursor consisting of (a) a rework material obtained from a process of making hydroprocessing catalysts and (b) a hydrocarbon oil diluent which is not heavy oil feedstock,
 wherein the rework material has an average particle size of greater than 1 μm and less than 300 μm, wherein the rework material is obtained by grinding a supported catalyst to an average particle size of less than 300 μm and greater than 1 μm;
 wherein the pre-sulfided catalyst precursor becomes slurry catalyst upon being introduced into the ebullated bed reactor with a heavy oil feedstock through the expanded catalyst zone and reduces formation of sediments and coke formation in the ebullated bed reactor.

2. The dual catalyst system of claim 1, wherein the rework material has an average particle size of 2-150 pm.

3. The dual catalyst system of claim 1, wherein the rework material is obtained from a process of making a supported catalyst.

4. The dual catalyst system of claim 1, wherein the rework material is mixed with the diluent in an amount of 5 to 40 wt. % of total weight of the diluent.

5. The dual catalyst system of claim 1, wherein the slurry catalyst prepared from rework material has an internal pore volume ranging from 0.5 cm$^3$/g to 1.8 cm$^3$/g.

6. The dual catalyst system of claim 1, wherein the slurry catalyst prepared from rework material has a polymodal pore size distribution with at least a first mode having at least 80% pore sizes ranging from 5 to 2000 Angstroms.

7. The dual catalyst system of claim 1, wherein the slurry catalyst prepared from rework material has at least 30% of pore sizes of at least 100 Angstrom in diameter.

8. The dual catalyst system of claim 1, wherein the slurry catalyst prepared from rework material has a total surface area of at least 100 m$^2$/g.

9. The dual catalyst system of claim 1, wherein the diluent is selected from VGO, cycle oil, gasoline, distillate, naphtha, light cycle oil, benzene, toluene, xylene, diesel oil, heptane, and mixtures thereof.

10. The dual catalyst system of claim 1, wherein the rework material is obtained from a process of making a supported catalyst comprising a porous refractory base.

* * * * *